Sept. 19, 1967 H. LUECHINGER ETAL 3,343,026
SEMI-CONDUCTIVE RADIATION SOURCE
Filed Nov. 27, 1963
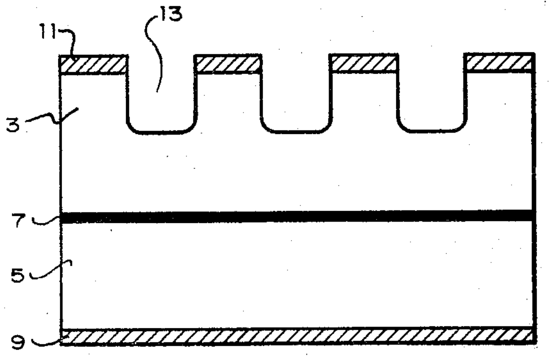
INVENTORS
H. LUECHINGER
E.E. LOEBNER
BY J. I. Chapman
ATTORNEY

United States Patent Office 3,343,026
Patented Sept. 19, 1967

3,343,026
SEMI-CONDUCTIVE RADIATION SOURCE

Herman Luechinger and Egon E. Loebner, Palo Alto, Calif., assignors to h-p associates, Palo Alto, Calif., a corporation of California

Filed Nov. 27, 1963, Ser. No. 326,563
3 Claims. (Cl. 313—108)

This invention relates to a semi-conductive radiation source having a high output of light (visible and invisible).

One of the problems encountered in the manufacture of efficient electroluminor diodes (such as gallium arsenside) is the design of electrode structures which allow the maximum escape of light from the body of the semi-conductor after the radiation is generated in or near the PN-junction. Since some of the light generated is absorbed in the electroluminor itself, it is important to minimize its passage through the electroluminor.

It is the principal object object of this invention to provide an electroluminor having a high light output.

In accordance with the illustrated embodiment of this invention, one surface of an electroluminor is provided with a plurality of depressions which come very close to the PN-junction.

Other and incidental objects of this invention will be apparent to those skilled in the art from a reading of this specifiication and an inspection of the accompanying drawing which shows a cross-section of an electroluminor in accordance with this invention.

Referring now to the drawings, there is shown an electroluminor such as gallium arsenide comprising a layer 3 of N-material and a layer 5 of P-material, the inner surfaces of which form a P-N junction 7. The outer surface of the layer 5 of P-material is provided with an electrode 9. The outer surface of the layer 3 of N-material is provided with a plurality of peaks and valleys. The peaks are provided with conductive material so as to form electrode 11. The valleys 13 are fairly deep and may be located at a distance of the order of one or a few microns from the P-N junction 7. The light and radiation generated at or near the P-N junction 7 does not have to travel through much of the electroluminor material to escape and is therefore subjected to less attenuation. Alternatively, it may be the layer of P-material, or both P-material and N-material layers, which may be provided with these peaks and valleys.

A practical way to fabricate the electroluminor in accordance with this invention is as follows: a gallium arsenide wafer approximately ½" in diameter, about 100 microns thick and containing a P-N junction is provided with continuous metal electrodes on both sides. Although either side or both sides of the wafer can be fabricated in the manner described we shall confine the description to the N-side using a metal such as a gold-tin alloy. (In the case of the P-side other contact materials are used such as aluminum or a silver-zinc alloy.) After the metal layer has been deposited (about ½-micron thick) a continuous layer of resist (such as Kodak metal etch resist) is deposited on the wafer. A mesh pattern of ultraviolet radiation is then exposed for four minutes upon this resist layer. This pattern is obtained from a mask consisting of a photographic film containing a square matrix array of squares of 60 x 60 microns and separated by 100 microns center on center. After the exposure to ultraviolet light with a mercury vapor lamp a four-minute development in stoddad solvent is follolowered by rinse in xylene and deionized water. The wafer is then baked for one hour at 140° C. The result is a hard resist mesh 40 microns wide with 60 x 60 micron holes on top of the metal electrode. This mesh is resistant to the etch which may be of one part of aqua regia and one part of water, and which attacks both the gold-tin electrode and the gallium arsenide wafer as well. The rate of etch of this etching solution is such that the resist withstands several minutes of exposure. Thus one may control the depth of perforations into gallium arsenide by the time of etching and the concentration of the etch. The resist is then removed with methylene chloride, which does not attack gallium arsenide or the metal electrode.

What is claimed is:

1. An electroluminor comprising a body of semiconductor material including contiguous layers of P-material and N-material forming a P-N junction therebetween, a plurality of recesses in the outer surface of one of the layers which extend into the body toward the junction for decreasing the thickness of said one layer about the junction in the regions of said recesses, electrode means contacting the remaining portion of the outer surface of said one layer about said recesses for providing an equipotential connection thereto; and electrode means contacting the outer surface of the other of said layers for providing an equipotential connection thereto, whereby electromagnetic radiation emanating from the region about said P-N junction is transmitted through said one layer with less absorption and attenuation in the regions of said recesses than in the remaining regions of said one layer.

2. An electroluminor as in claim 1 wherein:
said recesses extend inward toward the P-N junction from the outer surface of the layer of N-material.

3. An electroluminor as in claim 1 wherein:
said recesses extend inward toward the P-N junction from the outer surface of the layer of P-material.

References Cited

UNITED STATES PATENTS

| | | | |
|---|---|---|---|
| 2,954,486 | 9/1960 | Doucette et al. | 317—235 |
| 3,005,937 | 10/1961 | Wallmark et al. | 317—235 |
| 3,018,391 | 1/1962 | Lindsay et al. | 317—235 |
| 3,076,104 | 1/1963 | Miller | 317—234 |
| 3,150,999 | 11/1964 | Rudenberg et al. | 317—235 |

JAMES W. LAWRENCE, *Primary Examiner.*

R. JUDD, *Assistant Examiner.*